US009551998B2

(12) United States Patent
Adachi

(10) Patent No.: US 9,551,998 B2
(45) Date of Patent: Jan. 24, 2017

(54) REMOTE CONTROL DEVICE

(71) Applicant: YAMAHA HATSUDOKI KABUSHIKI KAISHA, Iwata-shi, Shizuoka (JP)

(72) Inventor: Hajime Adachi, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 14/901,593

(22) PCT Filed: Jun. 27, 2014

(86) PCT No.: PCT/JP2014/067178
§ 371 (c)(1),
(2) Date: Dec. 28, 2015

(87) PCT Pub. No.: WO2014/208726
PCT Pub. Date: Dec. 31, 2014

(65) Prior Publication Data
US 2016/0342162 A1    Nov. 24, 2016

(30) Foreign Application Priority Data
Jun. 28, 2013    (JP) .................................. 2013-137412

(51) Int. Cl.
*G05D 1/00* (2006.01)
*B64C 13/20* (2006.01)
(Continued)

(52) U.S. Cl.
CPC ............. *G05D 13/04* (2013.01); *B64C 39/024* (2013.01); *G05D 1/0016* (2013.01); *G05D 1/0202* (2013.01); *B64C 2201/024* (2013.01)

(58) Field of Classification Search
CPC ...... G05D 13/00; G05D 13/04; G05D 1/0011; G05D 1/0016; G05D 1/0066; G05D 1/0088; G05D 1/0202; G05D 1/0204; G05D 1/0808; B64C 2201/024; B64C 2201/14; B64C 2201/146; B64C 2203/00; B64C 29/00; B64C 27/04; B64C 39/00; B64C 39/024; B64C 2700/6201; B64C 2700/6281
(Continued)

(56) References Cited

U.S. PATENT DOCUMENTS 6,059,226 A * 5/2000 Cotton ................. G05D 1/0858
244/17.13
2004/0245378 A1* 12/2004 Nonami ................. A63H 27/12
244/17.13
(Continued)

FOREIGN PATENT DOCUMENTS

CN    102854887 A    1/2013
CN    102945046 A    2/2013
(Continued)

OTHER PUBLICATIONS

Official Communication issued in International Patent Application No. PCT/JP2014/067178, mailed on Sep. 22, 2014.

*Primary Examiner* — Thomas G Black
*Assistant Examiner* — Sara Lewandroski
(74) *Attorney, Agent, or Firm* — Keating and Bennett, LLP

(57) ABSTRACT

A remote control device includes an instruction transmitter and a controller which controls a speed of an unmanned helicopter based on an instruction from the instruction transmitter. The instruction transmitter selectively outputs one of a speed change signal that changes the speed of the unmanned helicopter and a speed determination signal that determines the speed of the unmanned helicopter. When an output from the instruction transmitter is changed from the speed change signal to the speed determination signal, the (Continued)

controller determines whether the speed of the unmanned helicopter should be maintained or brought to zero based on a result of comparison between speed information of the unmanned helicopter and a threshold value. Preferably, the speed change signal changes the speed of the unmanned helicopter by changing a tilt angle of a nose of the unmanned helicopter in an up-down direction in accordance with an amount of operation applied to the instruction transmitter.

6 Claims, 7 Drawing Sheets

(51) Int. Cl.
- *B64C 27/04* (2006.01)
- *A63H 30/04* (2006.01)
- *G05D 13/04* (2006.01)
- *G05D 1/02* (2006.01)
- *B64C 39/02* (2006.01)

(58) Field of Classification Search
USPC .............................................................. 701/2
See application file for complete search history.

(56) References Cited

U.S. PATENT DOCUMENTS

| | | | |
|---|---|---|---|
| 2009/0069956 A1* | 3/2009 | Taya | A63H 27/02 701/2 |
| 2009/0171516 A1* | 7/2009 | Reich | B64C 13/20 701/2 |
| 2015/0286216 A1* | 10/2015 | Miwa | G05D 1/0011 701/4 |
| 2016/0216710 A1* | 7/2016 | Hu | G08G 5/0069 |

FOREIGN PATENT DOCUMENTS

| | | |
|---|---|---|
| GB | 2 073 114 A | 10/1981 |
| JP | 64-1010 A | 1/1989 |
| JP | 3-58959 B2 | 9/1991 |
| JP | 8-10451 A | 1/1996 |
| JP | 11-255196 A | 9/1999 |
| JP | 2004-268737 A | 9/2004 |
| JP | 2004268737 A * | 9/2004 |
| JP | 2005-178558 A | 7/2005 |
| JP | 4130598 B2 | 8/2008 |
| JP | 2009-96369 A | 5/2009 |

* cited by examiner

FIG. 5
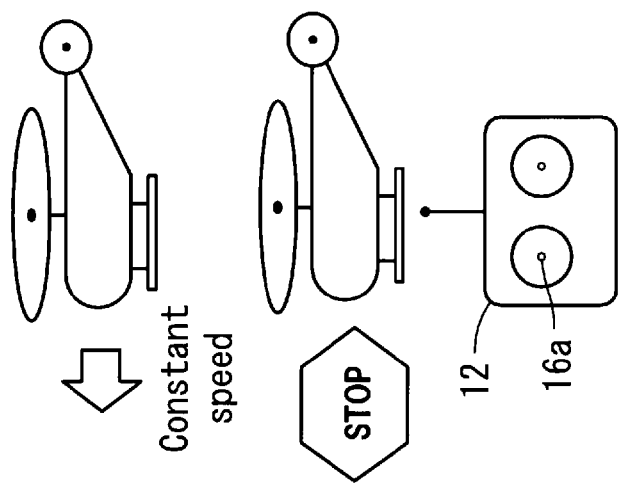
(a)
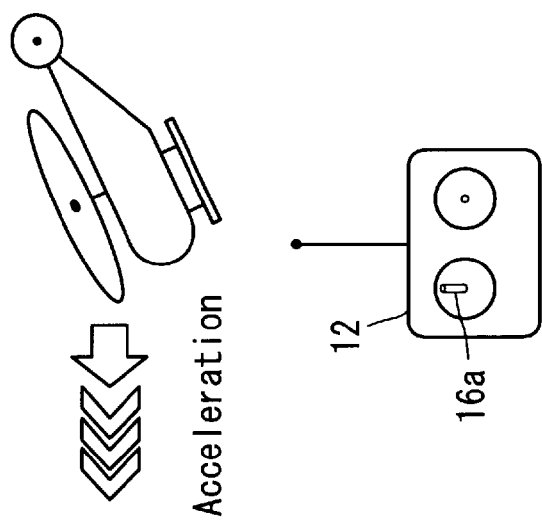
(b) Acceleration
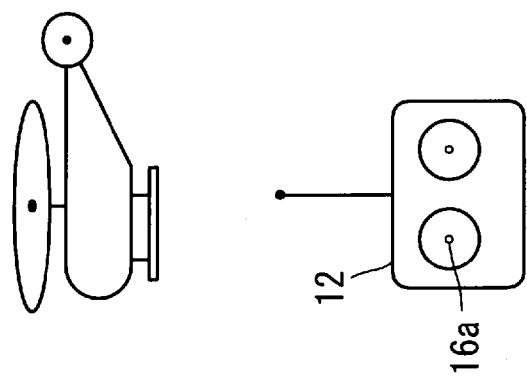
(c) Constant speed / STOP F I G. 7
(a)
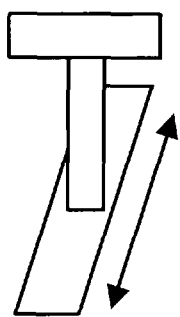
(b)
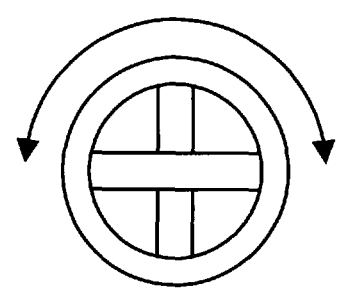
(c)
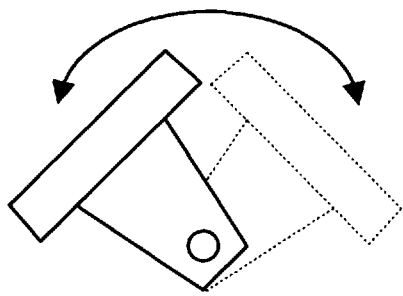
(d)
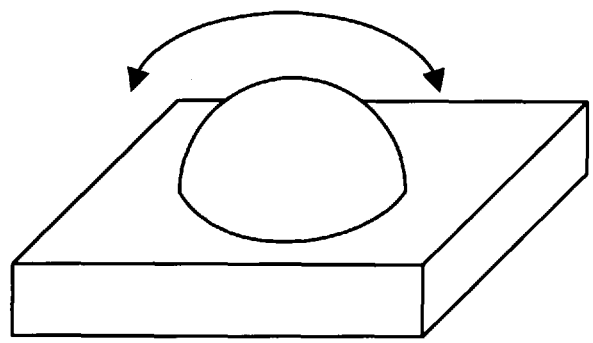

REMOTE CONTROL DEVICE

BACKGROUND OF THE INVENTION

1. Field of the Invention

The present invention relates to remote control devices, and more specifically to a remote control device which is used to control transportation equipment such as an unmanned helicopter.

2. Description of the Related Art

An example of a conventional technique of this kind is disclosed in JP-A 2009-96369.

JP-A 2009-96369 discloses an operation assisting device for an unmanned radio-controlled helicopter. The operation assisting device is interposed between a receiver and servo motors in a conventional unmanned radio-controlled helicopter, and includes a microcomputer, a PWM signal reading circuit, a PWM signal generation circuit, a PWM signal switching circuit, and various sensors. With the arrangement described above, hovering is performed when the operator's operation is in neutral, and when there is an operation by the operator, the servo motors are controlled accordingly or an amount of the operation is interpreted as a target value and the control is performed to follow the value.

However, if a desired flying speed is to be maintained at a constant level, the above-described operation assisting device is difficult for an operator to operate and requires a high level of skill. In particular, under external conditions such as strong winds, it becomes even more difficult to maintain a stable and constant flying speed of the helicopter.

SUMMARY OF THE INVENTION

Therefore, preferred embodiments of the present invention provide a remote control device that easily maintains transportation equipment at a desired speed.

According to a preferred embodiment of the present invention, a remote control device for transportation equipment includes an instruction transmitter that instructs a speed of the transportation equipment, and a controller that controls the speed of the transportation equipment based on the instruction from the instruction transmitter. The instruction transmitter selectively outputs one of a speed change signal that changes the speed of the transportation equipment and a speed determination signal that determines the speed of the transportation equipment, and the controller determines whether the speed of the transportation equipment should be maintained or brought to zero based on a result of comparison between speed information of the transportation equipment and a threshold value when the output from the instruction transmitter is changed from the speed change signal to the speed determination signal.

According to a preferred embodiment of the present invention, the operator outputs a speed change signal from the instruction transmitter whereupon the transportation equipment accelerates or decelerates. Then, as the operator changes the output from the instruction transmitter from the speed change signal to a speed determination signal, a comparison is made between speed information of the transportation equipment at this specific time point and the threshold value. If an absolute value of the speed information of the transportation equipment is not smaller than the threshold value (or greater than the threshold value), the speed of the transportation equipment is maintained. On the other hand, if the absolute value of the speed information of the transportation equipment is smaller than the threshold value (or not greater than the threshold value), the speed of the transportation equipment is brought to zero, and the transportation equipment is stopped. Also, if the absolute value of the speed information of the transportation equipment is not smaller than the threshold value (or greater than the threshold value), it is possible to fine-tune the speed of the transportation equipment by quickly alternating the output from the instruction transmitter between the speed change signal and the speed determination signal, and then maintain a desired speed. It is thus possible to maintain the transportation equipment at a desired speed easily by simply changing the output from the instruction transmitter from the speed change signal to the speed determination signal.

Generally, when remotely controlling an unmanned helicopter, an instruction transmitter in a remote control device is operated to change a tilt angle of a nose of the unmanned helicopter in an up-down direction to vary the speed of the unmanned helicopter. The speed of the unmanned helicopter preferably is controlled using two methods, i.e., so-called "attitude control" and so-called "speed control". In the "attitude control", a tilt angle of the nose in an up-down direction is changed in accordance with an amount of operation applied to the instruction transmitter such that the speed of the unmanned helicopter is varied. In the "speed control", a tilt angle of the nose in an up-down direction is varied so as to attain a target speed corresponding to an amount of operation applied to the instruction transmitter, and once the target speed is attained, this speed becomes a target speed to maintain. Each operator uses one of the "attitude control" and the "speed control" as his/her main method to remotely control an unmanned helicopter depending on his/her preference, an amount of experience, etc. In a preferred embodiment of the present invention, preferably, the transportation equipment is an unmanned helicopter. In this case, when outputting the speed change signal from the instruction transmitter, the operator easily maintains the unmanned helicopter at a desired speed by simply outputting the speed determination signal from the instruction transmitter in whichever control of the "attitude control" and the "speed control" he/she selects. Therefore, preferred embodiments of the present invention are suitable for any type of operator, i.e., those who prefer the "attitude control" and those who prefer the "speed control".

Preferably, the remote control device includes a switch or the like to switch between the "attitude control" and the "speed control" aside from the instruction transmitter that inputs instructions regarding the speed. In the "attitude control" where the tilt angle of the nose in the up-down direction is changed in accordance with the amount of operation applied to the instruction transmitter, it is difficult to control the helicopter to fly at a constant speed or hover continuously because if the amount of operation applied to the instruction transmitter is maintained at a constant level in order to tilt the nose obliquely downward, then a helicopter body moves forward at an accelerating speed. In such a case, the switch or the like is used to change from the "attitude control" to the "speed control". In the "speed control", a process to attain the target speed is based on speed signals obtained from GPS satellites. If signals from the GPS satellites are unavailable, it becomes impossible to control the speed. In such a case, the switch or the like must be used to change from the "speed control" to the "attitude control". In addition to this, the helicopter body moves differently when it is in the "attitude control" and when it is in the "speed control" even if the amount of operation applied to the instruction transmitter is the same, and therefore operational feeling of the instruction transmitter is different. Consequently, the operator must have a high level of operation skill in order to control the helicopter as desired even immediately after a change-over between the "attitude control" and the "speed control". In a preferred embodiment of the present invention, preferably, the speed change signal is a signal which changes the speed of the unmanned helicopter by changing a tilt angle of a nose of the unmanned helicopter in an up-down direction in accordance with an amount of operation applied to the instruction transmitter. In this case, the helicopter is in the "attitude control" when the speed change signal is outputted from the instruction transmitter. When the speed determination signal is outputted, the unmanned helicopter is in a state of being maintained at a constant speed. Hence, with a simple change from the "attitude control" where the speed change signal is outputted from the instruction transmitter to a state where the speed determination signal is outputted, it becomes easy to fly the unmanned helicopter at a constant speed, or to change from flying in a low speed range to hovering. There is no need for the operator to operate a switch or the like to make a change between the "attitude control" and the "speed control" other than the instruction transmitter. Further, the operator is not required to have a high level of operation skill because as far as the instruction transmitter is outputting the speed change signal (in other words, when changing the speed), the helicopter is in the "attitude control" so he/she can perform operations without any difference from a case where the "attitude control" has been selected specifically by using a specific switch or the like.

Preferably, the instruction transmitter is movable from a baseline position. In this arrangement, the instruction transmitter is movable in a range which includes a speed determination range that outputs the speed determination signal from the instruction transmitter and a speed change range that outputs the speed change signal from the instruction transmitter. The speed determination range includes the baseline position, whereas the speed change range is outside of the speed determination range as viewed from the baseline position. With the above arrangement, the controller determines whether the speed of the transportation equipment should be maintained or brought to zero based on a result of comparison between speed information of the transportation equipment and the threshold value when the instruction transmitter is moved from the speed change range into the speed determination range. In this case, when the operator moves the instruction transmitter from the baseline position, passing through the speed determination range into the speed change range, then the speed of the transportation equipment is changed in accordance with the amount of operation applied to the instruction transmitter. Then, as the operator returns the instruction transmitter from the speed change range to the speed determination range (typically to the baseline position), the speed information of the transportation equipment at this time point is compared to the threshold value, and based on a comparison result, the speed of the transportation equipment is maintained or brought to zero. Such an arrangement, i.e., that the speed determination range is between the baseline position and the speed change range so that the instruction transmitter cannot reach the speed change range unless it is moved from the baseline position and through the speed determination range, makes the speed determination range function as a so-called "play" zone in relation to speed change operation of the transportation equipment. Therefore, it becomes possible to prevent unintentional speed changes of the transportation equipment which are not intended by the operator. This arrangement makes it possible to change the speed of the transportation equipment easily and only when the operator wants to do so.

Further preferably, the instruction transmitter is movable in both a positive direction and a negative direction from the baseline position. In this arrangement, the speed determination range includes the baseline position, and is on both the positive side and the negative side of the baseline position; the speed change range includes a first change range on the positive side of the baseline position and a second change range on the negative side of the baseline position outside of the speed determination range as viewed from the baseline position. With the above arrangement, the instruction transmitter outputs a speed change signal that accelerates the transportation equipment when the instruction transmitter is in the first change range, and the instruction transmitter outputs a speed change signal that decelerates the transportation equipment when the instruction transmitter is in the second change range. In this case, the first change range and the second change range are arranged in directions extending away from each other as viewed from the baseline position. This makes operations easy and clear when the operator accelerates or decelerates the transportation equipment using the instruction transmitter. It is possible to easily control a forward moving speed and a backward moving speed of the transportation equipment, and to significantly reduce or prevent undesired or unintended operations.

Further, preferably, the instruction transmitter includes a stick-shaped member (e.g., joystick) which returns to the baseline position unless a force is applied, and an operation angle of the joystick represents an amount of operation applied to the instruction transmitter. In this case, when the operator tilts the joystick from the baseline position, passing through the speed determination range into the speed change range, then the speed of the transportation equipment is changed in accordance with the operation angle of the joystick. Then, as the operator returns the joystick from the speed change range to the speed determination range, the speed information of the transportation equipment at this time point is compared to the threshold value, and based on a comparison result, the speed of the transportation equipment is maintained or brought to zero. In other words, if an absolute value of the speed information of the transportation equipment is not smaller than the threshold value (greater than the threshold value), control is performed to maintain the speed of the transportation equipment. On the other hand, if the absolute value of the speed information of the transportation equipment is smaller than the threshold value (not greater than the threshold value), control is performed to bring the speed of the transportation equipment to zero (and then maintain that speed thereafter). It is possible to maintain the transportation equipment at a desired speed easily by simply operating the joystick thus changing the output from the instruction transmitter from the speed change signal to the speed determination signal. Also, the joystick returns to the baseline position if no force is applied. Therefore, the operator should apply a force to tilt the joystick only when accelerating or decelerating the transportation equipment, and there is no need to operate the joystick to maintain the speed of the transportation equipment. This makes operation of the instruction transmitter easy. Further, since the joystick returns to the baseline position if there is no operation being made to the joystick, it is possible to prevent undesired acceleration and deceleration of the transportation equipment.

The above and other elements, features, steps, characteristics and advantages of the present invention will become

BRIEF DESCRIPTION OF THE DRAWINGS

FIGS. 5A through 5C are illustrative drawings for describing behavior of the unmanned helicopter.

FIGS. 7A through 7D are illustrative drawings which show variations of an instruction transmitter.

DETAILED DESCRIPTION OF THE PREFERRED EMBODIMENTS

Hereinafter, preferred embodiments of the present invention will be described with reference to the drawings.

Figure 1:
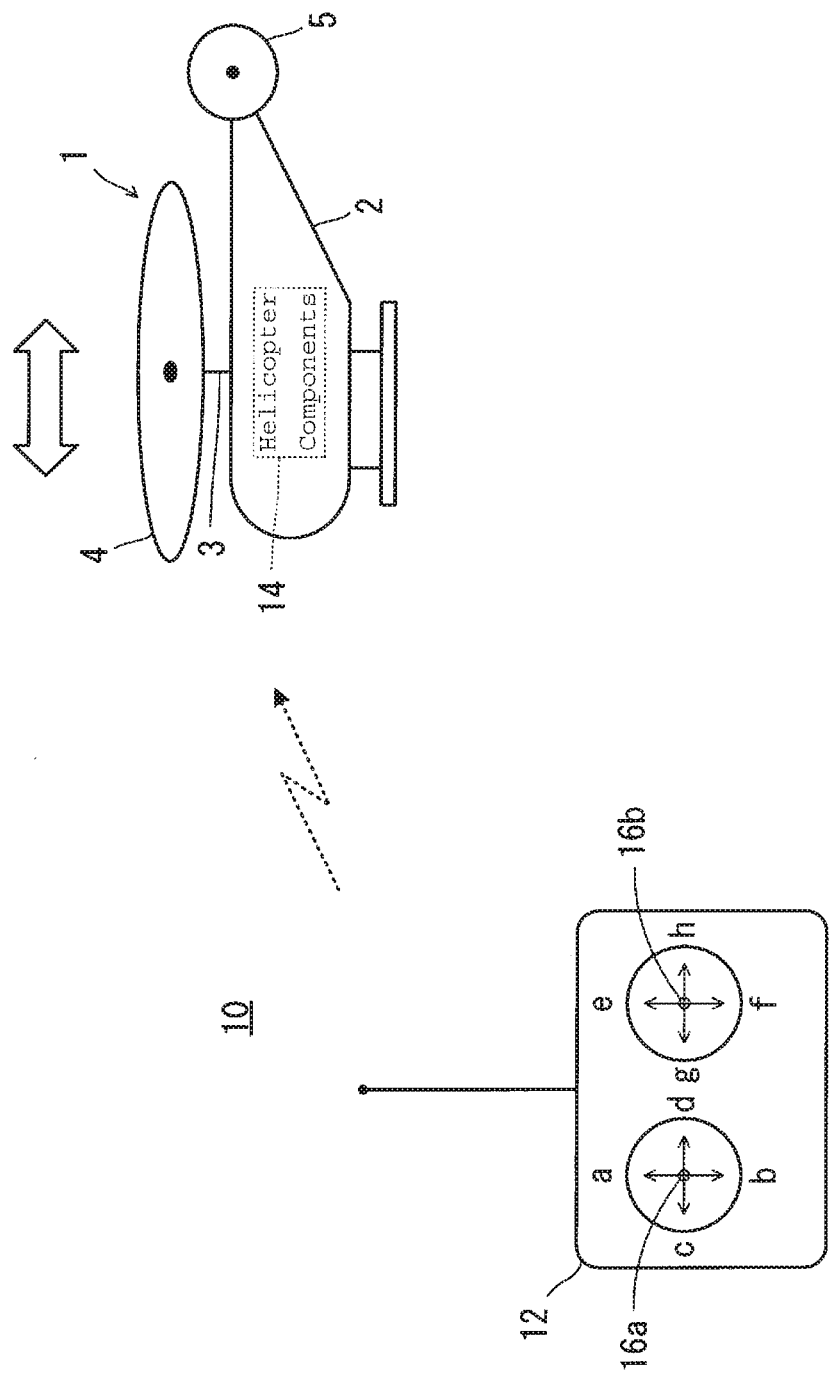
FIG. 1 is an illustrative drawing which shows a preferred embodiment of the present invention, where a transportation equipment is an unmanned helicopter.

In a preferred embodiment of the present invention shown in FIG. 1, a transportation equipment preferably is, for example, an unmanned helicopter 1 (hereinafter, simplified as helicopter 1). Therefore, a remote control device 10 according to the preferred embodiment shown in FIG. 1 is a remote control device for the helicopter 1.

The helicopter 1 includes a body 2, a mast 3, a main rotor 4, and a tail rotor 5. The mast 3 protrudes upward from the body 2 and is rotatable. The mast 3 includes an upper end portion where the main rotor 4 is fixed. The tail rotor 5 is rotatable and is located at a rear end portion of the body 2. The main rotor 4 and the tail rotor 5 are rotated based on a driving force from an unillustrated drive source.

The remote control device 10 includes a transmitter 12 which transmits signals toward the helicopter 1, and helicopter components 14 which are installed in the helicopter 1.

Figure 2:
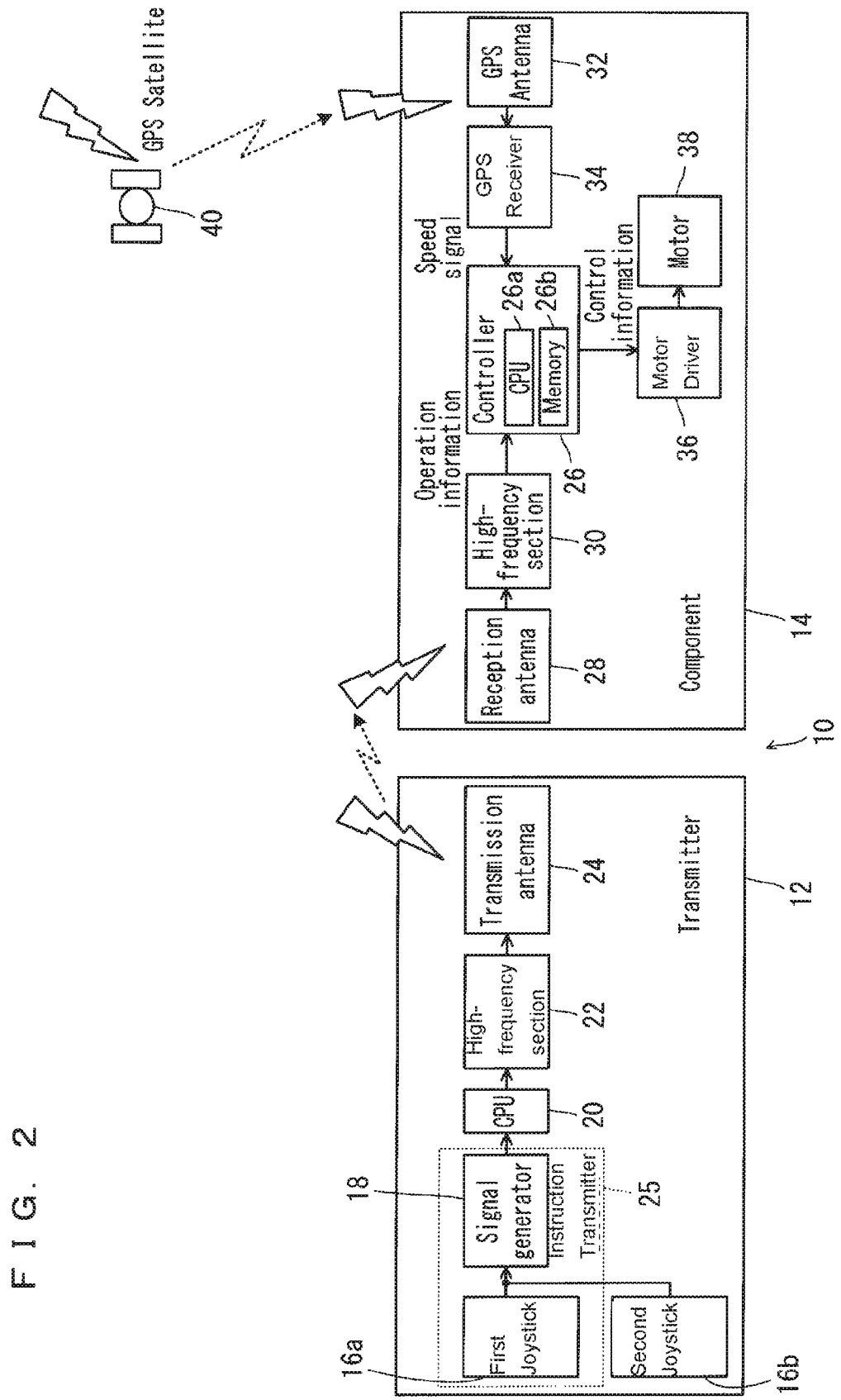
FIG. 2 is an electrical block diagram which shows a configuration example of a remote control device.

Referring to FIG. 2, the transmitter 12 includes a first joystick 16a, a second joystick 16b, a signal generator 18, a CPU 20, a high-frequency section 22, and a transmission antenna 24.

Referring to FIG. 1, when the first joystick 16a is moved in directions ab (fore-aft direction), a motor 38 (which will be described below) is controlled to change an in-flight angle of a nose of the helicopter 1 in an up-down direction to accelerate or decelerate (forward or backward) the helicopter 1. Moving the first joystick 16a in the direction a moves the nose down to cause the helicopter 1 to accelerate (fly forward), whereas moving the first joystick 16a in the direction b moves the nose up to cause the helicopter 1 to decelerate (fly backward).

Also, moving the first joystick 16a in directions cd (left-right direction) causes the nose to turn in a left-right direction. Moving the second joystick 16b in directions of (fore-aft direction) causes the helicopter body to ascend or descend. Moving the second joystick 16b in directions gh (left-right direction) causes the helicopter body to tilt leftward or rightward.

The signal generator 18 generates analog operation information in accordance with an operation angle(s) of the first joystick 16a and/or the second joystick 16b from their baseline positions. The CPU 20 converts the given analog operation information into digital operation information, and sends it to the high-frequency section 22. The operation information includes a speed determination signal and a speed change signal. In the high-frequency section 22, modulation with the digital operation information is performed, and an obtained radio signal is transmitted from the transmission antenna 24.

In a preferred embodiment of the present invention, the speed of the helicopter 1 is instructed by an instruction transmitter 25, which includes the first joystick 16a and the signal generator 18.

The helicopter components 14 include a controller 26, a reception antenna 28, a high-frequency section 30, a GPS antenna 32, a GPS receiver 34, a motor driver 36, and a motor 38.

The radio signal which is sent from the transmission antenna 24 of the transmitter 12 is received by the reception antenna 28, and then demodulated by the high-frequency section 30 into digital operation information which represents the operation angles, and the information is supplied to the controller 26. Also, GPS signals, which are supplied from GPS satellites 40 and are relevant to the operation of the helicopter 1, are received by the GPS antenna 32 and supplied to the GPS receiver 34. In the GPS receiver 34, a speed signal which indicates a current speed of the helicopter 1 is extracted from the supplied GPS signals. The speed signal is supplied to the controller 26.

The controller 26 includes a CPU 26a and a memory 26b. The CPU 26a (controller 26) executes programs stored in the memory 26b, and provides instructions to various constituent elements, thus controlling the helicopter 1. For example, the CPU 26a (controller 26) generates control information based on the supplied operation information and speed signal and controls the motor driver 36. The motor driver 36 drives the motor 38. By driving the motor 38, an angle of the main rotor 4 is changed to adjust an angle in an up-down direction of the nose of the in-flight helicopter 1.

The instruction transmitter 25 will now be described.

Figure 3:
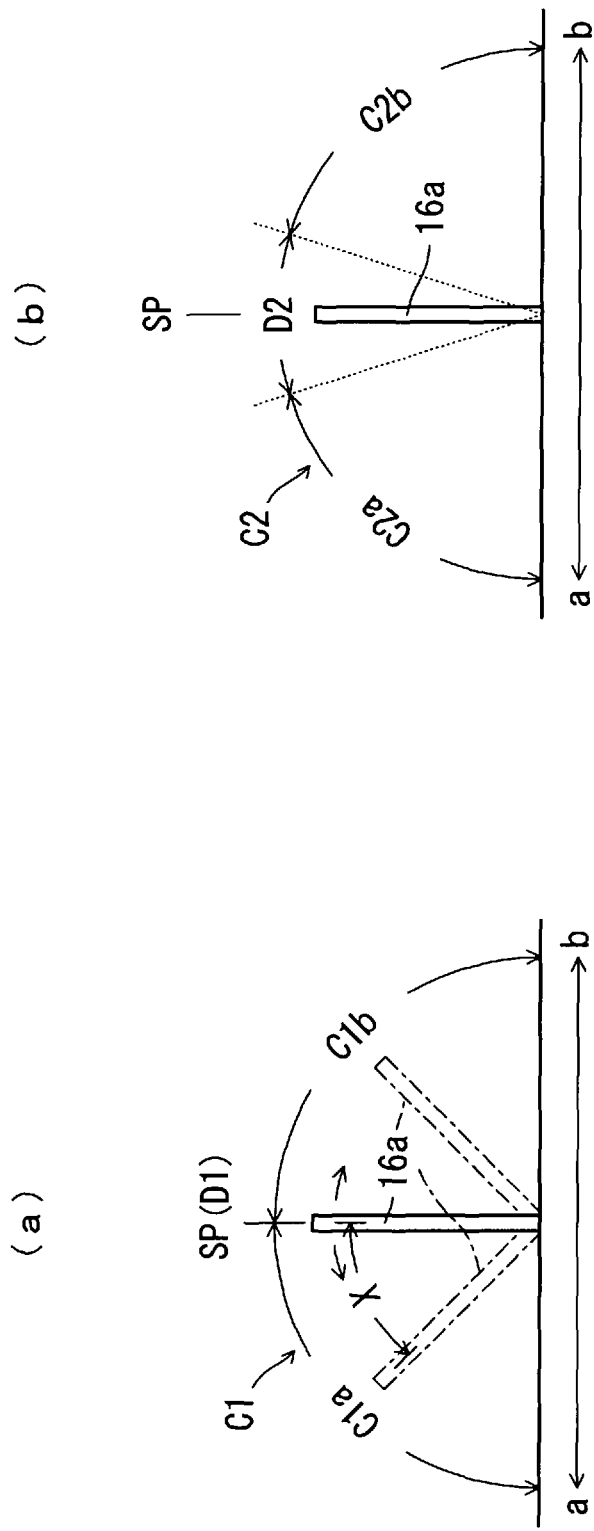
FIGS. 3A and 3B are illustrative drawings which show ranges of movement of a first joystick.

Referring also to FIG. 3A, the first joystick 16a is movable (tiltable) from a baseline position SP (neutral position) in a fore-aft direction (both positive and negative directions: directions ab). The first joystick 16a is movable in a range which includes a speed determination range D1 and a speed change range C1. When the first joystick 16a is in the speed determination range D1, a signal outputted from the signal generator 18 is a speed determination signal. When the first joystick 16a is in the speed change range C1, a signal outputted from the signal generator 18 is a speed change signal. In other words, the instruction transmitter 25 selectively outputs one of the speed change signal which changes the speed of the helicopter 1 and the speed determination signal which determines the speed of the helicopter 1. The speed change signal from the instruction transmitter 25 (signal generator 18) changes the speed of the helicopter 1 by changing the tilt angle of the nose in the up-down direction in accordance with an amount of operation applied to the instruction transmitter 25 (an operation angle X of the first joystick 16a).

In the present preferred embodiment, the baseline position SP is the speed determination range D1. Therefore, a slight tilting of the first joystick 16a from the baseline position SP in a fore-aft direction brings the first joystick 16a into the speed change range C1, causing the hovering helicopter 1 to start moving or causing the moving helicopter 1 which is flying at a constant speed to change its flying speed (accelerate or decelerate). In other words, if the first joystick 16a is at the baseline position SP, the flying speed of the helicopter 1 does not change, and the state of hovering or flight at a constant speed is maintained. Fine tuning of the flying speed of the helicopter 1 is possible only when the first joystick 16a is moved into the speed change range C1.

The speed change range C1 includes a first change range C1a which is on the forward side (positive side) of the baseline position SP (speed determination range D1), and a second change range C1b which is on the rearward side (negative side) of the baseline position SP (speed determination range D1). When the first joystick 16a is in the first change range C1a, the signal generator 18 outputs a speed change signal for acceleration. When the first joystick 16a is in the second change range C1b, the signal generator 18 outputs a speed change signal for deceleration. The first joystick 16a returns to the baseline position SP when there is no force applied thereto. The operation angle X of the joystick 16a from the baseline position SP represents the amount of operation applied to the instruction transmitter 25.

Figure 4:
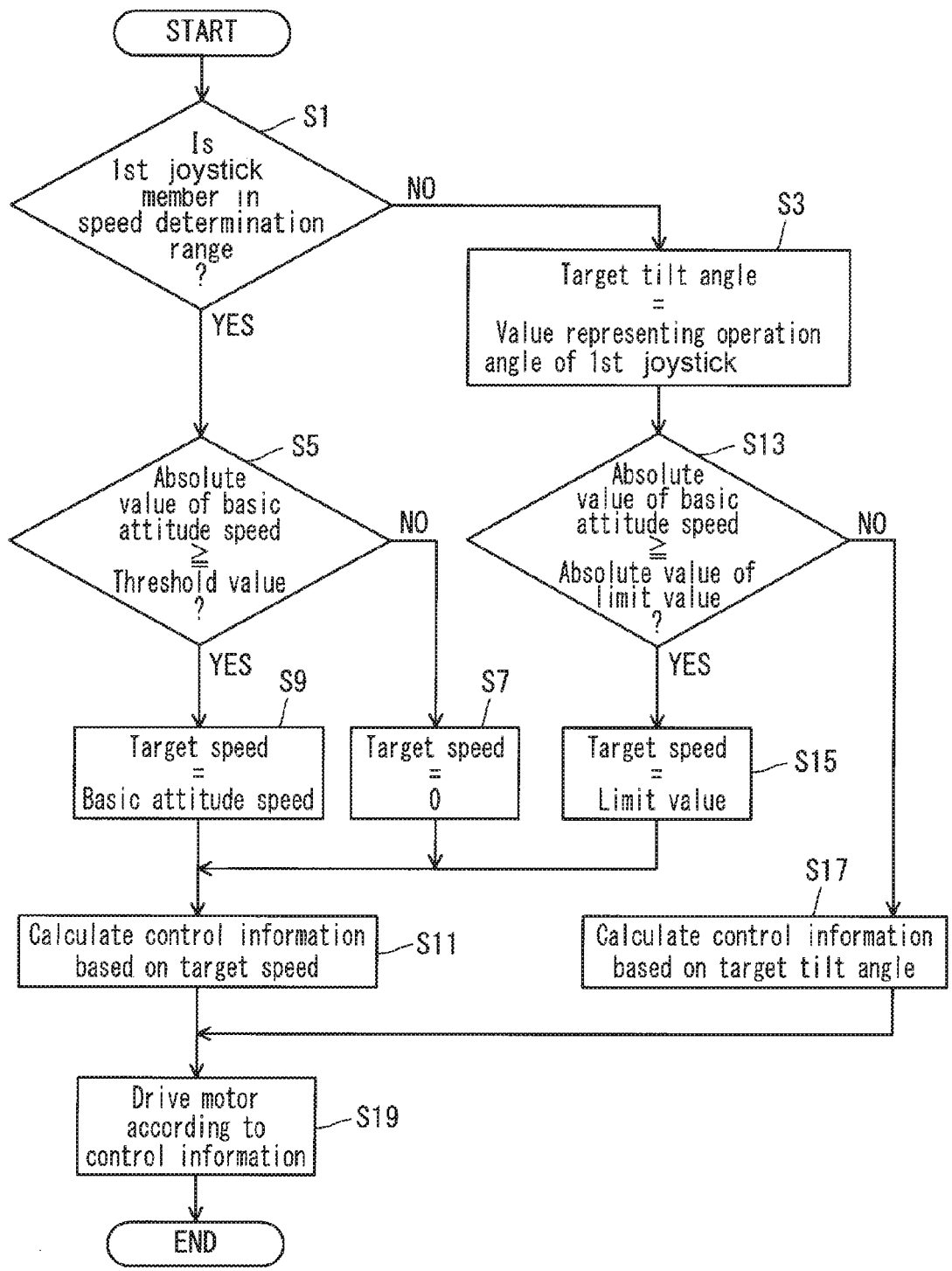
FIG. 4 is a flowchart which shows an example of a control process performed the remote control device.

Referring to FIG. 4, description will be made of an example of a control process by the remote control device 10 while the helicopter 1 is in flight. It should be noted here that each of target tilt angle, operation angle X, target speed, current speed, basic attitude speed, and limit value takes a positive (+) or a negative (−) value. The term target tilt angle refers to an angle of tilt in the up-down direction of the nose of the helicopter 1 (helicopter body) as a target. The tilt angle is measured from a reference (zero) which is a value when the helicopter 1 is at a basic attitude (attitude of the helicopter 1 when the helicopter 1 is grounded on a horizontal plane). The target tilt angle takes a positive (+) value when the nose is tilting downward, and takes a negative (−) value when the nose is tilting upward. The operation angle X takes a positive (+) value when the first joystick 16a is located at a more forward position than the baseline position SP (neutral position), and takes a negative (−) value when located at a more rearward position. For unmanned helicopters to fly at a constant speed, the helicopter body must be maintained in the basic attitude. For this reason, there is a transition from a state where the helicopter body is at a tilt (current speed) to a state of the basic attitude, and during this transition there is a slight acceleration or deceleration. Based on this, the basic attitude speed refers to an estimated speed of the helicopter 1 at an expected time point when the helicopter body will attain the basic attitude from an attitude of the helicopter body at the time point of the speed estimation. Typically, the basic attitude speed is an estimated speed obtained by adding an acceleration or deceleration to be made until the time when the basic attitude is attained to a speed signal (current speed) which is supplied from the GPS satellites 40 while the helicopter body is in a tilted state. Thus, the basic attitude speed is calculated by the CPU 26a (controller 26) from the current speed. In the present preferred embodiment, the basic attitude speed represents the speed information. It should be noted here that if the helicopter body is already in the basic attitude when the basic attitude speed is calculated, then the basic attitude speed is equal to the current speed. Each of the target speed, the current speed, the basic attitude speed, and the limit value takes a positive (+) value in a forward flight and a negative (−) value in a backward flight.

First, Step S1 determines whether or not the first joystick 16a is located in the speed determination range D1. In other words, whether or not the first joystick 16a is at the baseline position SP is determined. The determination is made by the controller 26 in the helicopter components 14 based on operation information from the transmitter 12.

If Step S1 determines that the first joystick 16a is not in the speed determination range D1 but is in the speed change range C1, then the process goes to Step S3. Moving to Step S3 means that the helicopter 1 is in an accelerating or decelerating state. In Step S3, the controller 26 sets the target tilt angle to a value in accordance with the operation angle X of the first joystick 16a, and then the process goes to Step S13. Step S13 determines whether or not an absolute value of the basic attitude speed of the helicopter 1 is not smaller than an absolute value of the limit value (for example, about 20 km per hour, in the present preferred embodiment). If the absolute value of the basic attitude speed of the helicopter 1 is not smaller than the absolute value of the limit value, the process goes to Step S15, where the target speed of the helicopter 1 is set to the limit value (for example, about 20 km per hour for forward flight and about −20 km per hour for backward flight, in the present preferred embodiment), and then the process goes to Step S11. On the other hand, if Step S13 determines that the absolute value of the basic attitude speed of the helicopter 1 is smaller than the absolute value of the limit value, the process goes to Step S17, where the controller 26 calculates control information based on the target tilt angle of the helicopter 1, and then the process goes to Step S19.

On the other hand, if Step S1 determines that the first joystick 16a is in the speed determination range D1, the process goes to Step S5. Moving to Step S5 means that the helicopter 1 is in a state of hovering or flight at a constant speed.

Step S5 determines whether or not the absolute value of the basic attitude speed of the helicopter 1 is not smaller than a threshold value (for example, about 10 km per hour, in the present preferred embodiment). The determination is made, based on the speed signal from the GPS satellites 40, by the controller 26 in the helicopter components 14. If the absolute value of the basic attitude speed of the helicopter 1 is smaller than the threshold value, the process goes to Step S7 where the target speed of the helicopter 1 is set to zero, and then the process goes to Step S11. On the other hand, if Step S5 determines that the absolute value of the basic attitude speed of the helicopter 1 is not smaller than the threshold value, the process goes to Step S9. In Step S9, the controller 26 sets the target speed of the helicopter 1 to the basic attitude speed of the helicopter 1. Then, the process goes to Step S11.

In Step S11, the controller 26 calculates control information based on the target speed of the helicopter 1, and then the process goes to Step S19.

In Step S19, the motor driver 36 is controlled in accordance with the calculated control information, and the motor driver 36 drives the motor 38 to change an angle of the main rotor 4 such that the tilt angle of the nose of the in-flight helicopter 1 in the up-down direction is adjusted. After Step S19, the process returns to Step S1. In the present preferred embodiment, the control process shown in FIG. 4 is repeated at an interval of milliseconds through several tens of milliseconds, for example.

In accordance with the above-described control process by the remote control device 10, the controller 26 controls the speed of the helicopter 1 based on instructions from the instruction transmitter 25 (first joystick 16a).

In the control process shown in FIG. 4, the process goes to Step S17 in a case where Steps S3 and S13 have been executed to lead to Step S17. In this case, the first joystick 16a is in the speed change range C1. A process through these Steps to lead to Step S17 represents the "attitude control".

Also, in the control process shown in FIG. 4, a case where the process moves through Steps S5 and S7 and then to Step S11 represents the case where the controller 26 sets the speed of the helicopter 1 to zero based on a comparison result between the basic attitude speed of the helicopter 1 and the threshold value when the position of the instruction transmitter 25 (first joystick 16a) is changed from the speed change range C1 to the speed determination range D1, i.e., when the output from the instruction transmitter 25 (signal generator 18) changes from the speed change signal to the speed determination signal.

A case where the process moves through Steps S5 and S9 and then to Step S11 represents the case where the controller 26 maintains consistency of the speed of the helicopter 1 at the basic attitude speed based on a comparison result between the basic attitude speed of the helicopter 1 and the threshold value when the position of the instruction transmitter 25 (first joystick 16a) is changed from the speed change range C1 to the speed determination range D1, i.e., when the output from the instruction transmitter 25 (signal generator 18) changes from the speed change signal to the speed determination signal.

Referring to FIG. 5A, in a state where the helicopter 1 is hovering and the first joystick 16a stays in the speed determination range D1, then the controller 26 maintains hovering of the helicopter 1. In this case, the controller 26 provides a control to bring a flying speed of the helicopter 1 to zero based on GPS signals from the GPS satellites 40 and, therefore, reduces movement of the helicopter 1 even if there is an external factor such as wind.

Referring to FIG. 5B, if the first joystick 16a stays in the first change range C1a of the speed change range C1, then the controller 26 tilts the nose of the helicopter 1 downward to maintain a forward tilting attitude of the helicopter body so that the helicopter body keeps moving forward and keeps accelerating. However, the basic attitude speed is limited by the limit value (for example, about ±20 km per hour, in the present preferred embodiment). Therefore, when an absolute value of the basic attitude speed reaches the absolute value of the limit value, then the tilt angle of the nose of the helicopter 1 in the up-down direction is controlled to automatically bring the helicopter body into its horizontal attitude and to maintain the flying speed at the limit value.

Thereafter, if the first joystick 16a is moved from the first change range C1a to the second change range C1b of the speed change range C1, then the controller 26 tilts the nose of the helicopter 1 upward to tilt the helicopter body rearward, so that the helicopter body decelerates. If the first joystick 16a stays in the second change range C1b of the speed change range C1, then the controller 26 maintains the helicopter body in a rearward tilting attitude, so the helicopter body keeps decelerating and eventually moves backward.

Referring to FIG. 5C, if the first joystick 16a is moved from the first change range C1a of the speed change range C1 to the speed determination range D1, then the controller 26 compares the basic attitude speed of the helicopter 1 and the threshold value to each other. If an absolute value of the basic attitude speed of the helicopter 1 is not smaller than the threshold value, then the flying speed is brought to a constant level at the basic attitude speed. If the absolute value of the basic attitude speed is smaller than the threshold value, then the helicopter is brought to state of hovering.

Figure 6:
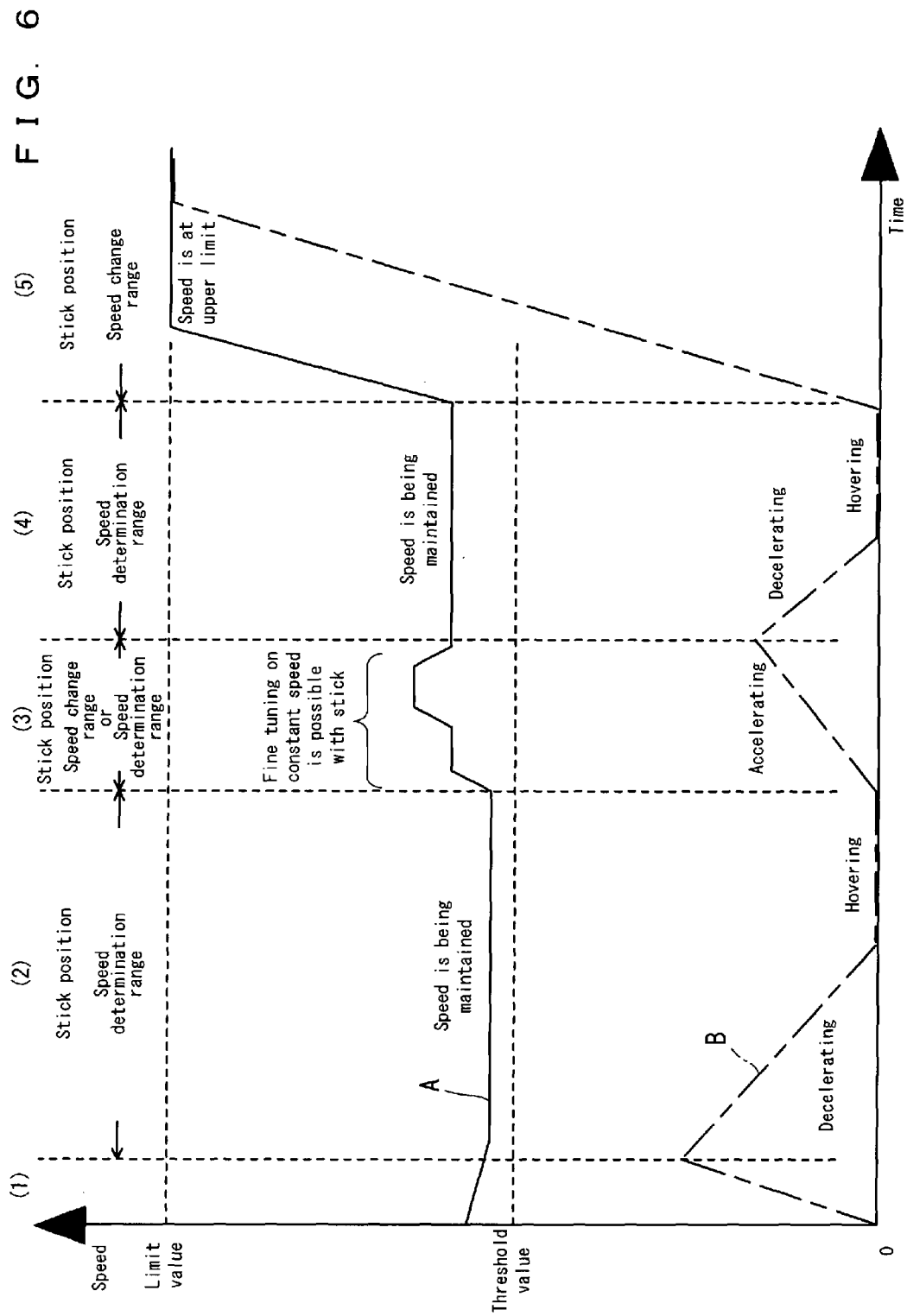
FIG. 6 is a graph which shows examples of time-course speed changes in the unmanned helicopter.

Referring to FIG. 6, description will be made of examples of time-course speed changes of the helicopter 1.

In FIG. 6, Line A shows a case where the speed of the helicopter 1 is controlled under a condition that the basic attitude speed of the helicopter 1 is greater than the threshold value. Line B shows a case where the speed of the helicopter 1 is controlled under a condition that the basic attitude speed of the helicopter 1 is smaller than the threshold value.

First, description will be made for Line A.

In Period (1), the first joystick 16a is in the second change range C1b, so the helicopter 1 decelerates. Period (2) starts with a basic attitude speed being greater than the threshold value. As the first joystick 16a stays in the speed determination range D1, the helicopter 1 maintains the basic attitude speed of the time point when it entered Period (2). In Period (3), the first joystick 16a is moved "from the first change range C1a→the speed determination range D1→the first change range C1a→the speed determination range D1→the second change range C1b→the speed determination range D1". In accordance with the operation made to the first joystick 16a, the speed of the helicopter 1 is increased/decreased to make fine adjustments on a constant speed. In Period (4), as the first joystick 16a stays in the speed determination range D1, the helicopter 1 maintains a basic attitude speed of the time when it entered Period (4). Thereafter, as Period (5) starts, the first joystick 16a is moved to and kept in the first change range C1a, then the speed of the helicopter 1 increases until the limit value is reached. If the first joystick 16a continues to stay in the first change range C1a thereafter, then the speed of the helicopter 1 is maintained at the limit value.

Next, Line B will be described.

In Period (1), the helicopter 1 is at a speed of zero (hovering), upon which the first joystick 16a is moved to and kept in the first change range C1a. Then, the speed of the helicopter 1 keeps increasing. However, the helicopter 1 enters Period (2) before its basic attitude speed reaches the threshold value. As the first joystick 16a is returned to the speed determination range D1, the helicopter 1 decelerates and the speed is eventually returned to zero to come into the state of hovering. Thereafter, in Period (3), the first joystick 16a is moved to and kept in the first change range C1a. Then, the speed of the helicopter 1 keeps increasing. However, the helicopter 1 enters Period (4) before its basic attitude speed reaches the threshold value. As the first joystick 16a is returned to the speed determination range D1, the helicopter 1 decelerates and the speed is eventually returned to zero to come into the state of hovering. Thereafter, as Period (5) starts, the first joystick 16a is moved to and kept in the first change range C1a, then the speed of the helicopter 1 increases until the limit value is reached. If the first joystick 16a continues to stay in the first change range C1a thereafter, then the speed of the helicopter 1 is maintained at the limit value.

According to the remote control device 10 described above, the helicopter 1 accelerates or decelerates as the operator outputs a speed change signal from the instruction transmitter 25. Then, as the operator changes the output from the instruction transmitter 25 from the speed change signal to a speed determination signal, a comparison is made between a basic attitude speed of the helicopter 1 at this specific time point and the threshold value. If the absolute value of the basic attitude speed of the helicopter 1 is not smaller than the threshold value, the tilt angle of the nose of the helicopter 1 in the up-down direction is controlled to maintain the speed of the helicopter 1. On the other hand, if the absolute value of the basic attitude speed of the helicopter 1 is smaller than the threshold value, the tilt angle of the nose of the helicopter 1 in the up-down direction is controlled to bring the speed of the helicopter 1 to zero, so that the helicopter 1 is brought into a state of hovering (or is maintained in the state of hovering). Also, if the absolute value of the basic attitude speed of the helicopter 1 is not smaller than the threshold value, it is possible to fine-tune the speed of the helicopter 1 by quickly alternating the output from the instruction transmitter 25 between the speed change signal and the speed determination signal, and then maintain a desired speed. It is possible to maintain the helicopter 1 at a desired speed easily by simply changing the output from the instruction transmitter 25 from the speed change signal to the speed determination signal.

According to the remote control device 10, the helicopter 1 is in the "attitude control" state when the speed change signal is outputted from the instruction transmitter 25, except for the case where the absolute value of the basic attitude speed of the helicopter 1 is not smaller than the absolute value of the limit value. The state in which the speed determination signal is outputted is a state where the speed of the helicopter 1 is maintained at a constant speed. Hence, with a simple change from the "attitude control" where the speed change signal is outputted from the instruction transmitter 25 to a state where the speed determination signal is outputted, it becomes easy to fly the helicopter 1 at a constant speed, or to change from flying in a low speed range to hovering. There is no need for the operator to operate a switch or the like to make a change between "attitude control" and "speed control" other than the instruction transmitter 25. Further, the operator is not required to have a high level of operation skill because as far as the instruction transmitter 25 is outputting a speed change signal (in other words, when changing the speed), the helicopter is in the "attitude control" so he/she can perform operations without any difference from a case in which the "attitude control" has been selected specifically by using a different switch, etc.

In the remote control device 10, the first change range C1a and the second change range C1b are arranged in directions spaced apart from each other as viewed from the baseline position SP. This simplifies and clarifies operations which must be performed to the instruction transmitter 25 by the operator when accelerating or decelerating the helicopter 1. It is possible to easily control forward moving speed and backward moving speed of the helicopter 1, and to decrease unintended or undesired operations.

In the remote control device 10, as the operator tilts the first joystick 16a from the baseline position SP (speed determination range D1) into the speed change range C1, the speed of the helicopter 1 is changed in accordance with the operation angle X of the first joystick 16a. Then, as the operator returns the first joystick 16a from the speed change range C1 into the speed determination range D1, a basic attitude speed of the helicopter 1 at this time point is compared to a threshold value, and based on a comparison result, the speed of the helicopter 1 is maintained or the helicopter 1 is brought into a hovering state. In other words, if the absolute value of the basic attitude speed of the helicopter 1 is not smaller than the threshold value, a control is performed to maintain the speed of the helicopter 1 at the basic attitude speed. On the other hand, if the absolute value of the basic attitude speed of the helicopter 1 is smaller than the threshold value, a control is performed to bring the speed of the helicopter 1 to zero (and then keep it thereafter). As described, a simple operation on the first joystick 16a of changing the output from the instruction transmitter 25 from the speed change signal to the speed determination signal makes it possible to easily maintain the helicopter 1 at a desired speed. Also, the first joystick 16a returns to the baseline position SP if it receives no force. Therefore, the operator needs to apply his/her force in order to tilt the first joystick 16a only when he/she wants to accelerate or decelerate the helicopter 1, i.e., he/she does not have to manipulate the first joystick 16a to maintain the speed of the helicopter 1. This makes operation of the instruction transmitter 25 easy. Further, since the first joystick 16a returns to the baseline position SP if there is no operation being made to the first joystick 16a, it is possible to prevent undesired acceleration and deceleration of the helicopter 1.

When using the helicopter 1 for uniformly spraying agricultural chemicals, for example, it is preferable that the helicopter 1 flies at a constant speed over the target area of application. Since the helicopter 1 can fly at a desired speed easily and at a constant speed as well, it is applicable suitably to application of agricultural chemicals.

In the preferred embodiments described above, description was made for a case where the baseline position SP represents the speed determination range D1, for example. However, as shown in FIG. 3B, the speed determination range D2 may be a predetermined range provided in a fore-aft direction to sandwich the baseline position SP. In other words, the speed determination range D2 may be on both positive and negative sides of the baseline position SP, and include the baseline position SP. In this case, a speed change range C2 is provided in front of and behind the speed determination range D2. As viewed from the baseline position SP, the speed change range C2 includes a first change range C2a which is outside of the speed determination range D2 and in front (on the positive side) of the baseline position SP, and a second change range C2b which is outside of the speed determination range D2 and behind (on the negative side of) the baseline position SP.

In this case, when the operator moves the instruction transmitter 25 (first joystick 16a) from the baseline position SP, passing through the speed determination range D2 into the speed change range C2, then the speed of the helicopter 1 is changed in accordance with the amount of operation applied to the instruction transmitter 25. In other words, the helicopter 1 which was in the hovering state starts moving, or the helicopter 1 which was flying at a constant speed changes its speed. Then, as the operator returns the instruction transmitter 25 from the speed change range C2 to the speed determination range D2 (typically to the baseline position SP), a basic attitude speed of the helicopter 1 at this time point is compared to the threshold value, and based on a comparison result, the speed of the helicopter 1 is maintained or the helicopter is brought to a hovering state. Such an arrangement, i.e., that the speed determination range D2 is between the baseline position SP and the speed change range C2 so that the instruction transmitter 25 (first joystick 16a) cannot reach the speed change range C2 unless it is moved from the baseline position SP and through the speed determination range D2, makes the speed determination range D2 function as a so-called "play" zone in relation to speed change operation of the helicopter 1. Therefore, it becomes possible to prevent speed changes of the helicopter 1 which are not intended by the operator. This arrangement makes it possible to change the speed of the helicopter 1 easily, and only when the operator wants to do so.

In the operation example shown in FIG. 4 described above, description was made for a case which includes an "attitude control", i.e., if the first joystick 16a is in the speed change range C1, a target tilt angle of the helicopter 1 is set in accordance with the operation angle X of the first joystick 16a to vary the speed of the helicopter 1. However, the present invention is not limited to this. A "speed control" in which the speed of the helicopter 1 is controlled by setting a target speed of the helicopter 1 in accordance with the operation angle X of the first joystick 16a may be performed if the first joystick 16a is in the speed change range C1.

In the remote control device 10, the operator is able to maintain the helicopter 1 at a desired speed easily by outputting a speed determination signal from the instruction transmitter 25 in whichever control of the "attitude control" and the "speed control" he/she selects when outputting the speed change signal from the instruction transmitter 25. Hence, the remote control device 10 is suitable for whichever type of operator, i.e., those who prefer "attitude control" and those who prefer "speed control".

It should be noted here that in the preferred embodiments described above, description was made for a case where the speed of the helicopter 1 preferably is maintained if the absolute value of the basic attitude speed of the helicopter 1 is not smaller than a threshold value, whereas the speed of the helicopter 1 is brought to zero if the absolute value of the basic attitude speed of the helicopter 1 is smaller than the threshold value. However, the present invention is not limited to this. There may be an arrangement that the speed of the helicopter 1 is maintained if the absolute value of the basic attitude speed of the helicopter 1 is greater than a threshold value, whereas the speed of the helicopter 1 is brought to zero if the absolute value of the basic attitude speed of the helicopter 1 is not greater than the threshold value. In this case, if the absolute value of the basic attitude speed of the helicopter 1 is greater than the threshold value, it is possible to fine-tune the speed of the helicopter 1 by quickly alternating the output from the instruction transmitter 25 between the speed change signal and the speed determination signal.

In the preferred embodiments described above, description was made for a case where speed information preferably is provided by the basic attitude speed. However, the present invention is not limited to this. The speed information may be provided by the current speed instead of the basic attitude speed. In this case, determination on whether the speed of the helicopter 1 is maintained or brought to zero is based on a result of comparison between the current speed and a threshold value.

The instruction transmitter is not limited to a joystick. The instruction transmitter may be provided by a lever movable in a fore-aft direction as shown in FIG. 7A, a pivotable steering wheel as shown in FIG. 7B, a stool or a table tiltable in a fore-aft direction (weight-shiftable forward/rearward) as shown in FIG. 7C, a rotatable ball as shown in FIG. 7D, etc., for example.

Further, the instruction transmitter may include a plurality of buttons, such as a button that outputs a speed change signal and a button that outputs a speed determination signal.

In the above-described preferred embodiments, there may be an arrangement that the speed control of the helicopter 1 is switched to a conventional "attitude control" in a case where the remote control device 10 becomes unable to receive GPS signals.

In the above-described preferred embodiments, description was made for a case where transportation equipment preferably is a helicopter 1. However, the present invention is not limited by this. Transportation equipment to which various preferred embodiments of the present invention are applied preferably includes a piece of equipment which requires control for "moving at a constant speed" or "staying still at a position", e.g. those being unstable in a still state and moving by inertia on the ground, in the air, under or in the water, or on the ice or snow. Specifically, spherical bodies which move on the ground, monocycles or bicycles (electric two-wheel stand-ride scooters etc.), boats which move in the water, hovercrafts which move on ice and snow, submarines which move under the water, etc. are usable. It should be noted here that for submarines, speed detection will be possible by arranging the GPS antenna to stay above the water, or by employing an inertia navigation method using acceleration sensors.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A remote control device for transportation equipment, comprising:
    an instruction transmitter that instructs a speed of the transportation equipment; and
    a controller that controls the speed of the transportation equipment based on an instruction from the instruction transmitter; wherein
    the instruction transmitter selectively outputs one of a speed change signal that changes the speed of the transportation equipment and a speed determination signal that determines the speed of the transportation equipment; and
    the controller determines whether the speed of the transportation equipment should be maintained or brought to zero based on a result of comparison between speed information of the transportation equipment and a threshold value, when the output from the instruction transmitter is changed from the speed change signal to the speed determination signal.

2. The remote control device according to claim 1, wherein the transportation equipment is an unmanned helicopter.

3. The remote control device according to claim 2, wherein the speed change signal changes the speed of the unmanned helicopter by changing a tilt angle of a nose of the unmanned helicopter in an up-down direction in accordance with an amount of operation applied to the instruction transmitter.

4. The remote control device according to claim 1, wherein
    the instruction transmitter is movable from a baseline position;
    the instruction transmitter is movable in a range which includes a speed determination range that outputs the speed determination signal from the instruction transmitter and a speed change range that outputs the speed change signal from the instruction transmitter;
    the speed determination range includes the baseline position, and the speed change range is outside of the speed determination range as viewed from the baseline position; and
    the controller determines whether the speed of the transportation equipment should be maintained or brought to zero based on a result of comparison between speed information of the transportation equipment and the threshold value when the instruction transmitter is moved from the speed change range into the speed determination range.

5. The remote control device according to claim 4, wherein
    the instruction transmitter is movable in both a positive direction and a negative direction from the baseline position;

the speed determination range includes the baseline position, and is located on both a positive side and a negative side of the baseline position;

the speed change range includes a first change range on the positive side of the baseline position and a second change range on the negative side of the baseline position that are outside of the speed determination range as viewed from the baseline position; and the instruction transmitter outputs a speed change signal that accelerates the transportation equipment when the instruction transmitter is in the first change range, and the instruction transmitter outputs a speed change signal that decelerates the transportation equipment when the instruction transmitter is in the second change range.

6. The remote control device according to claim 4, wherein the instruction transmitter includes a joystick that returns to the baseline position unless a force is applied; and an operation angle of the joystick represents an amount of operation applied to the instruction transmitter.

* * * * *